Feb. 7, 1950     S. L. ADELSON     2,496,366
LIQUID LEVEL GAUGE

Filed Oct. 25, 1946            5 Sheets—Sheet 1

INVENTOR.
Samuel L. Adelson,
BY
ATTY.

Feb. 7, 1950 S. L. ADELSON 2,496,366
LIQUID LEVEL GAUGE
Filed Oct. 25, 1946 5 Sheets-Sheet 2
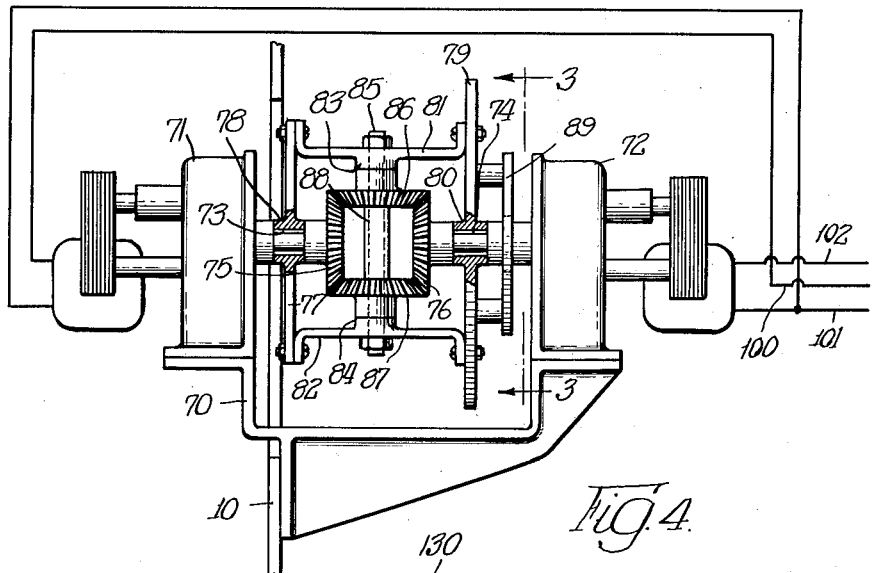
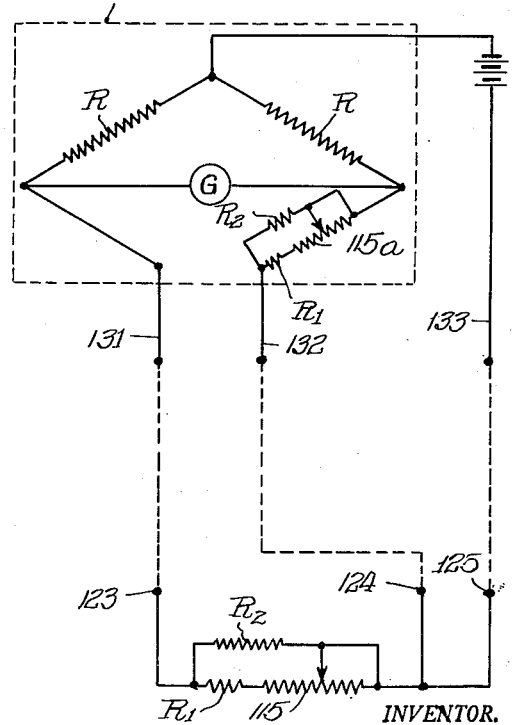
INVENTOR.
Samuel L. Adelson,
BY Robyn Wilcox
Atty.

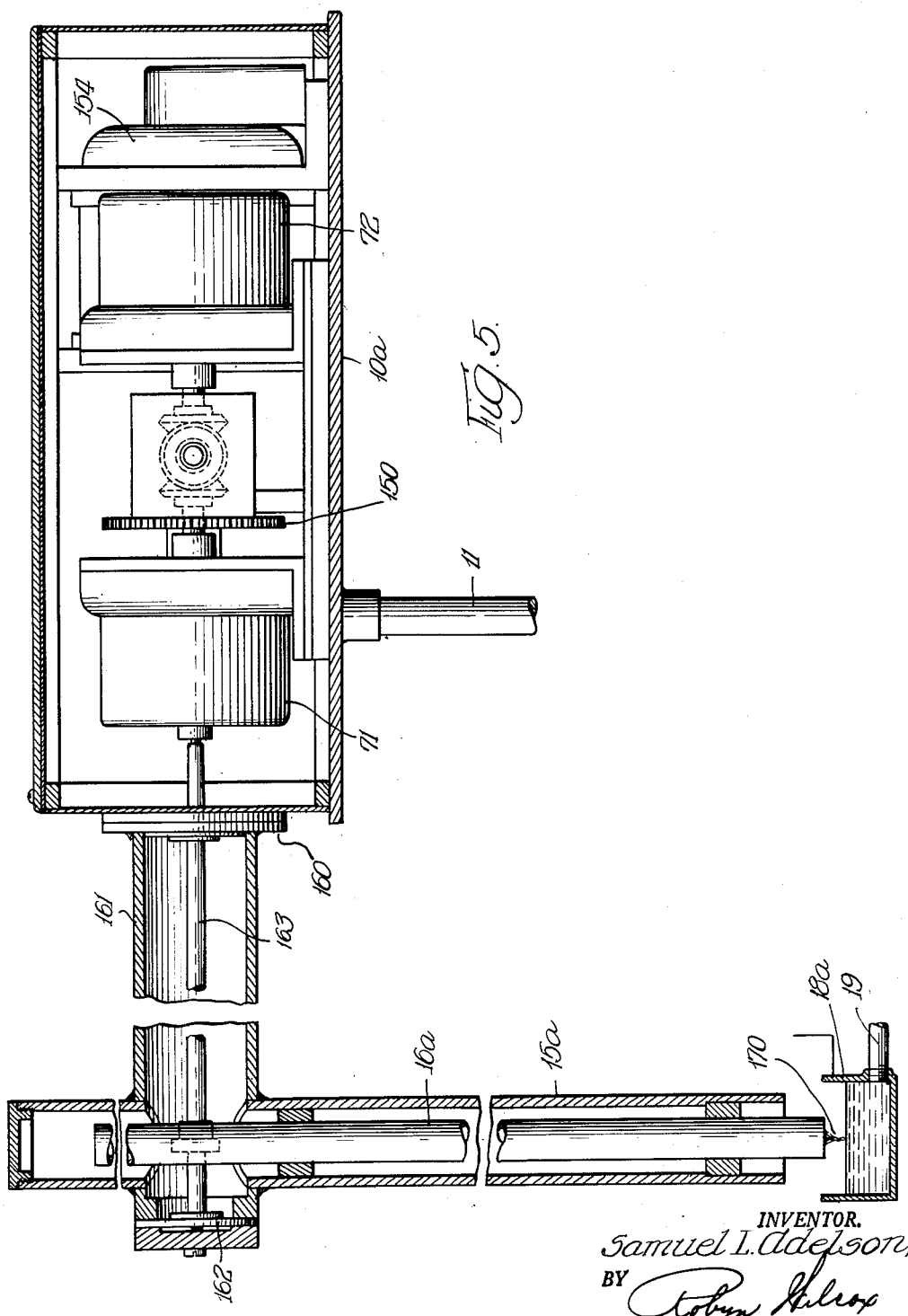

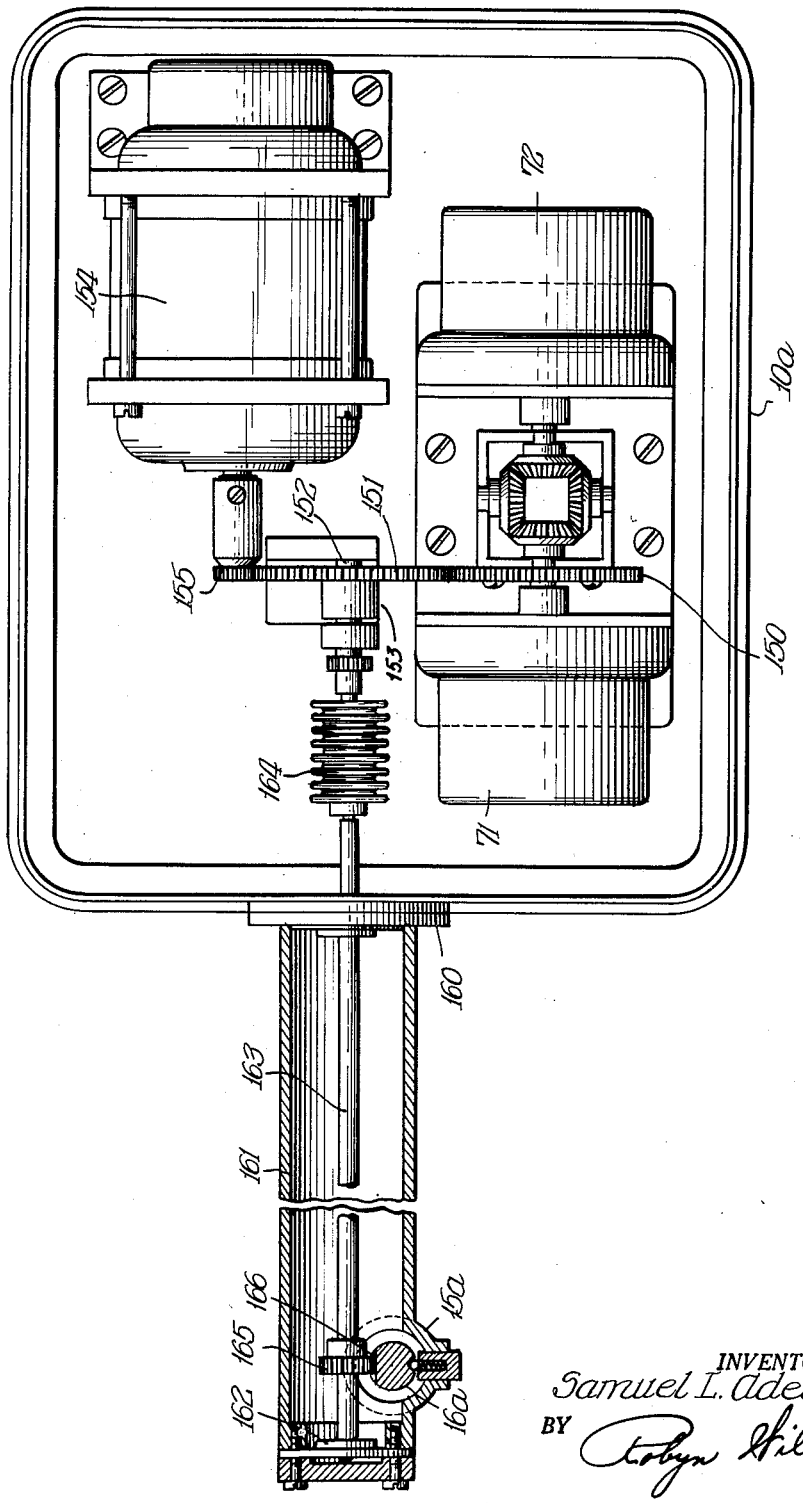

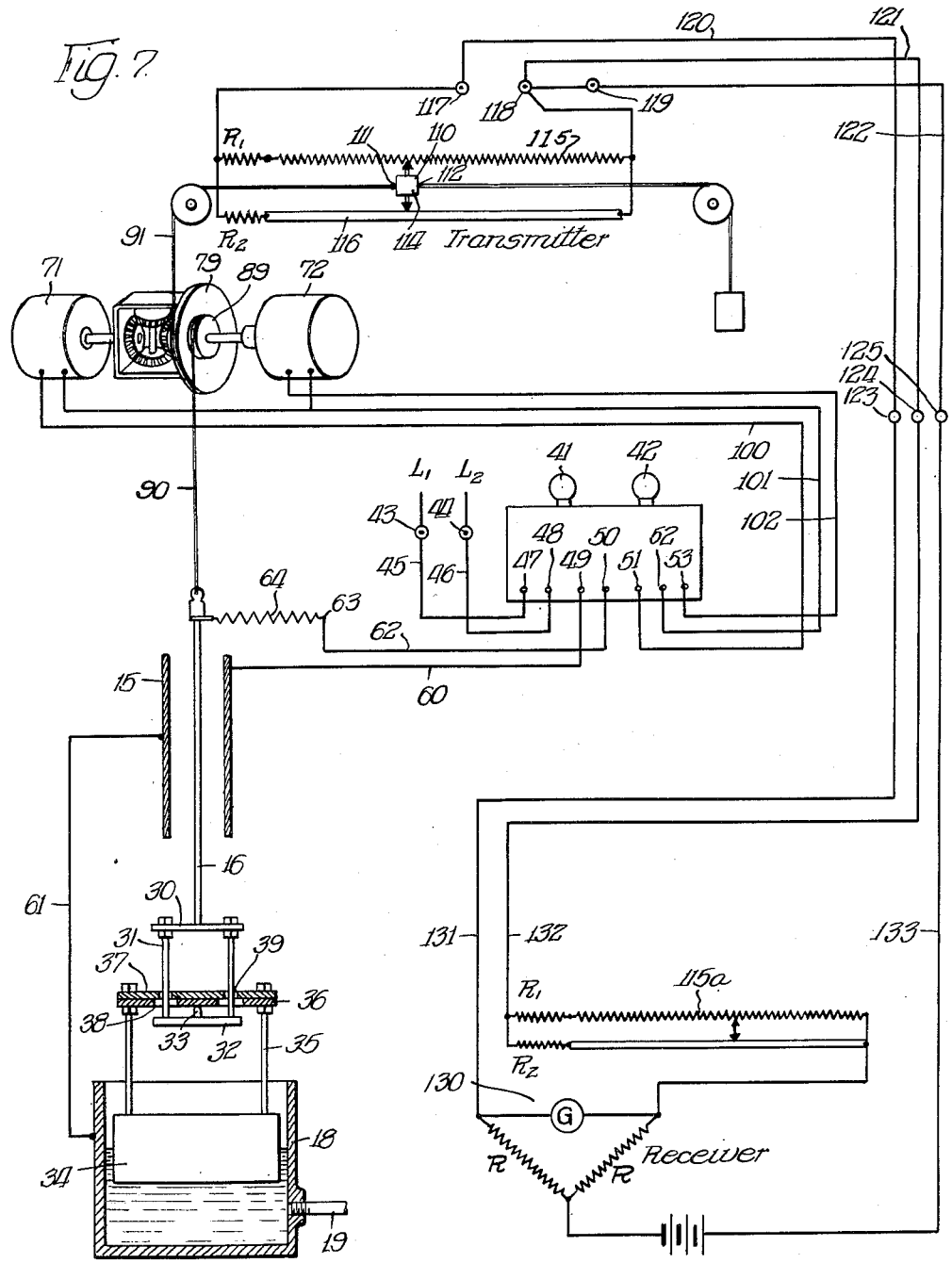

Patented Feb. 7, 1950

2,496,366

UNITED STATES PATENT OFFICE 2,496,366

LIQUID LEVEL GAUGE

Samuel L. Adelson, Chicago, Ill., assignor to Infilco Incorporated, Chicago, Ill., a corporation of Delaware Application October 25, 1946, Serial No. 705,577

5 Claims. (Cl. 177—380)

This invention refers to a telemetric device adapted to detect very small motion of movable members and to telemeter the magnitude of such motion to a remote point, and is particularly adapted to measure and transmit variations in the level of a liquid.

A primary object of this invention is to provide an improved liquid level measuring device.

Another principal object of this invention is to provide a device which detects very small changes in the elevation of a water surface (accurately registers variations of approximately $1/1000$ of an inch when using the float shown in Figure 1, and approximately $15/1000$ of an inch when using the whisker shown in Figure 5) and accurately transmits such changes to a remotely located receiver, which may indicate or record the changes, as well as the elevation of the water level at any particular time.

Still another object of this invention is to provide an apparatus for measuring the level of a liquid, the apparatus utilizing a single contact which directly or indirectly contacts the liquid surface and which is automatically raised or lowered so as to follow the liquid surface, as distinguished from meters of this type which utilize a plurality of fixed contacts, each of which is connected to a resistance of different value.

A further object of my invention is to provide a liquid level meter, or gauge, particularly adapted for telemetering systems, which is of simple construction and which is accurate over an infinite range of values.

These and other objects will be apparent from the description and claims which follow.

One of the elements of the meter, or transmitter, of my invention is known commercially under the trade name "Flashtron" which is an electronic device providing two immediately responsive, inertialess relays. A detail description of a "Flashtron" is found in Patent No. 2,208,235 of July 16, 1940. An element of the Flashtron is an actuator circuit which, when closed externally (even through a resistance as large as 20,000 ohms) will render only one of the relays conductive, while if the actuator circuit is broken only the other of the relays will be rendered conductive, whereby one or the other of the relays is always conductive depending upon whether the actuator circuit is opened or closed. In those cases in which extreme accuracy is not necessary, one of the relays can control the flow of current through one of the coil circuits of a reversible motor while the other relay controls the flow of current through the other of the coil circuits, so that the motor will rotate in one direction or the other depending upon whether the actuator circuit is opened or closed. However, I prefer, in order to secure extreme accuracy, to use two unidirectional motors in opposed relationship, one of the motors being connected to a source of power through one of the Flashtron relays and the other motor connected through the other. The two motors are connected to a differential gear arrangement whereby a gear cage will rotate in one direction or the other depending upon which motor is motionless or running at a speed lesser than that of the other, but which will remain motionless when both motors rotate at the same speed. Another element of the meter is a single contact member, directly or indirectly contacting the liquid level to be measured, which is connected to the reversible motor or the gear cage, as the case may be, so that it is raised or lowered depending upon whether the actuator circuit is opened or closed. By placing the contact and the liquid whose level is to be measured in the actuator circuit it is obvious that the contact member can be made to rise if it is in contact with the liquid and to lower if it is not. Still another element of the apparatus is a means for transmitting an electrical current of a variable characteristic, the transmitter being also positioned by movement of the gear cage or reversible motor.

My invention will be readily understood from a consideration of the following detailed description and of the drawings which form a part thereof and in which:

Figure 2 is an enlarged detail of the differential gear arrangement and cage using the two opposed unidirectional motors to position the contact and the transmitter.

Figure 3 is an end view of the gear cage shown in Figure 2 taken along the plane indicated by line 3—3 of Figure 2, showing one method of positioning both the contact and the transmitter from movement of the differential gear cage.

Figure 4 is a diagrammatic wiring sketch of the complete Wheatstone bridge circuit associated with the embodiment shown in Figure 1.

Figure 5 is a side view, partly in cross section, of another embodiment of my invention which utilizes a very sensitive Selsyn motor as the electric transmitter.

Figure 6 is a top view of the apparatus shown in Figure 5.

Figure 7 is a schematic wiring diagram of the complete power circuit of my apparatus, utilizing, for purposes of illustration, the telemetering apparatus of Figures 1 and 4.

Figure 1:
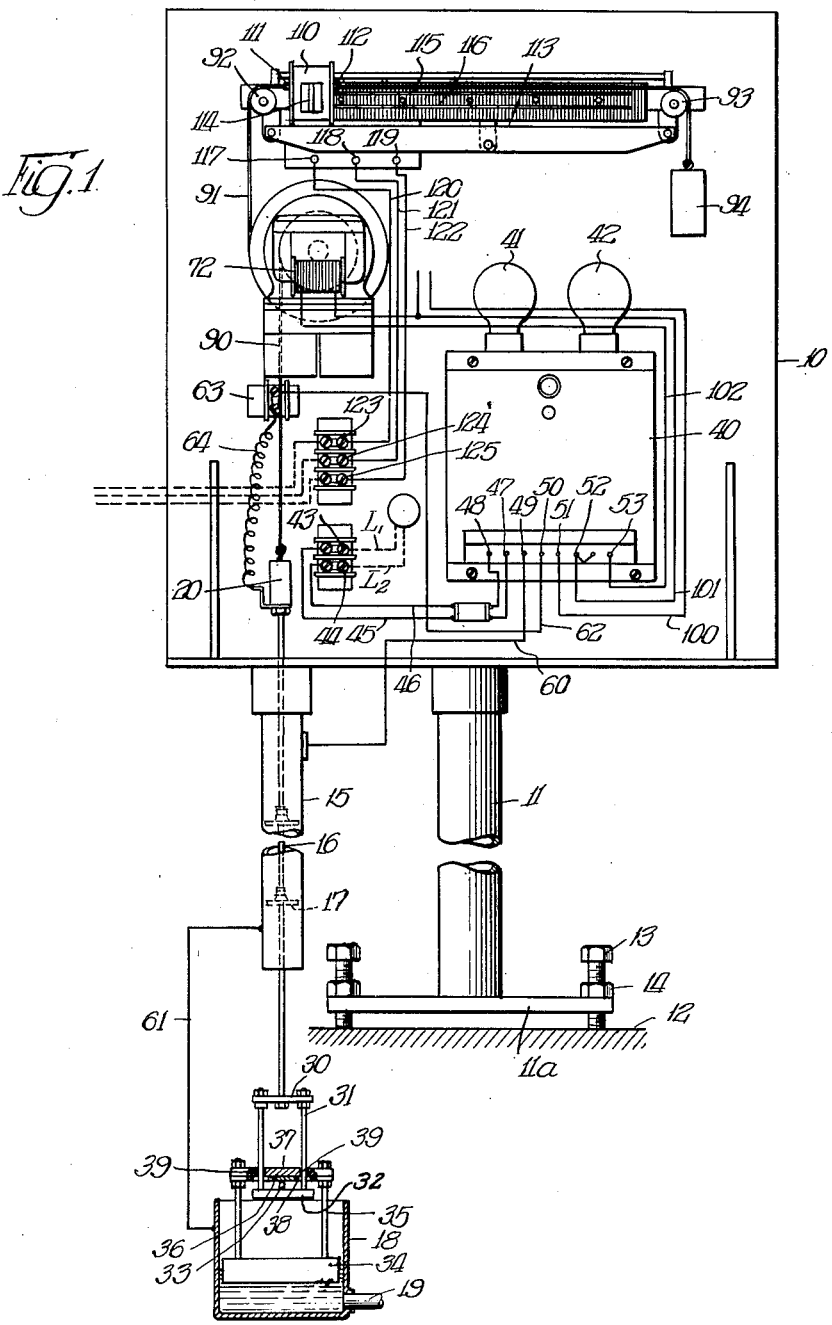
Figure 1 represents a side view, partly in cross section, of one embodiment of my invention in which the transmitting element comprises a Wheatstone bridge circuit.

The apparatus of my invention is mounted on a suitable supporting plate 10 which is preferably supported at a desired elevation by a standard 11 and base 11a resting on the floor 12. It will be recognized that for delicate and accurate measurements the apparatus should be level so that in my preferred form the base plate 11a is provided with leveling screws 13 threaded into base plate 11a and locked in position by lock nuts 14. A guide tube 15, preferably of metal, depends from the supporting plate 10. A metal rod 16 is slideably mounted in the guide tube 15 and carries the non-conducting guides 17, as shown. The diameter of the guides 17 is slightly less than the inside diameter of guide tube 15 so that rod 16 is free to slide within the guide tube 15 substantially in the center thereof. Also, it will be obvious to those skilled in the art that the rod 16 can dip directly into the liquid in the pot or chamber 18, as is shown in Figure 5, but I have found that much more accurate measurements can be secured by utilizing a float supported contact such as shown in Figure 1. As indicated above, the float contact provides accurate measurements of variations as small as approximately .001″, while the direct contact is accurate only to approximately .015″, due to the action of the surface film on the water when direct contact is used. The rod 16 is connected by an insulator 20 to a chain 90 which is raised or lowered by the reversing device to be described hereafter. Below the lower end of the guide tube 15 is a float pot or chamber 18, preferably of metal, which is connected to the liquid whose level is to be measured by means of pipe 19. It is preferred that the pot 18 be of such depth as to cover the entire range of the depth of liquid to be measured, as it is desired to use the pot or basin 18 as one arm of a U tube, the other arm being the body of liquid whose surface is to be measured. It will be obvious, of course, that the rod 16 can dip directly into the body of liquid, the surface of which is to be measured, but for most purposes it is more satisfactory to provide the small chamber 18 directly connected to the liquid.

In the embodiment shown in Figure 1 a yoke plate 30 is attached to the lower end of the metallic rod 16. A pair of legs 31 depend from the yoke plate 30 and carry a contact plate 32. On the upper surface of the contact plate 32 is a contact point 33. A float 34 rides on the liquid in the float chamber 18. Preferably the float is of substantially the same size as the float chamber 18 so as to prevent tilting in the liquid. Rising from the float 34 are standards 35 which carry a contact plate 36 and an insulating plate 37. The contact plate 36 is always in contact with standards 35. As shown in the drawing the legs 31 pass through corresponding holes in the contact plate 36 and the insulating plate 37. The holes 38 in the contact plate 36 are relatively large while the guide holes 39 in the insulating plate are just large enough to permit free passage of the legs 31 and thereby provide guides for the legs. It is necessary that there be no possible chance of electrical contact between the legs 31 and the contact plate 36, for closing of the actuator circuit must come through contact between the contact point 33 and the contact plate 36. In other words, in order to achieve accuracy, the actuator circuit must be opened and closed only between the contact point 33 and the contact plate 36. The legs 31 and the standards, or risers, 35 are so proportioned with regard to the range of maximum and minimum elevations of the liquid that at no time will the contact plate 32 come into mechanical contact with the top of the float 34, nor will the plate 30 ever be contacted by the plate 37. Because of this, free movement of the float upwardly will not be impeded at any time, nor will the downward movement of the rod 16 be impeded at any time, regardless of the rate at which the float may move upward or the rate at which the rod may move downward.

Also mounted on the supporting plate 10 is a "Flashtron" which includes two similar electronic tubes 41 and 42. As pointed out above, a "Flashtron" is an electronic device which can be purchased on the open market and, therefore, need not be described in detail. Essentially, a Flashtron constitutes a pair of immediately responsive and inertialess relays. One of the relays is operative upon closing of the actuator circuit while the other is operative upon the opening of the actuator circuit. Thus one or the other of the relays is open at all times.

The power supply for the apparatus may be of any suitable characteristic although I have preferred to use a 110 volt, 60 cycle current, as that is the type most usually available. As shown in Figures 1 and 7, the power lines $L_1$ and $L_2$ lead to binding posts 43 and 44, respectively, and thence through conductors 45 and 46 to the power input binding posts 47 and 48 of the Flashtron. The Flashtron is also provided with binding posts 49 and 50 for the actuator circuit and binding posts 51, 52 and 53 for connection to the reversible device to be operated.

The actuator circuit may comprise a ground wire 60 connecting the binding post 49 to the metallic guide tube 15. The tube 15 is connected to the float chamber or pot 18 by means of conductor 61. A conductor 62 leads from the other actuator binding post 50 to another binding post 63, from which leads a flexible wire 64 connected to the rod 16. The actuator circuit thus leads from the Flashtron binding post 50, through conductor 62, binding post 63, flexible wire 64, rod 16, plate 30, legs 31, plate 32, contact point 33, contact plate 36, risers 35, float 34, to the liquid in the float chamber 18, thence to the walls of the float chamber 18, conductor 61, guide tube 15 and conductor 60 to the binding post 49. Thus the actuator circuit is closed when the conact point 33, carried by the rod 16, engages the contact plate 36, carried by the float 34, and is opened when the two are apart. The actuator circuit is opened and closed only between the contact point 33 and the contact plate 36, and a separation of the order of $1/1000$ of an inch between the two is sufficient to open the actuator circuit. The actuator circuit thus is closed immediately the two are in contact, even though the resistance of this circuit is as large as 20,000 ohms.

A reversing device operated by the "Flashtron" is used to raise and lower the contact rod 16. This might be a reversible motor if accuracy and delicacy are not important. However, I prefer to use two unidirectional motors in opposed relationship and connected to a differential gear system, as I have found that they are much more delicate and accurate. Figure 2 shows a preferred reversing device which positions both the contact rod 16 and the transmitting device to be described hereafter. As shown, a bracket 70 is mounted on the supporting plate 10. Two similar unidirectional motors 71 and 72 are mounted in opposed relationship on the bracket 70, each having the same direction of rotation as one faces their respective output shafts 73 and 74. Rigidly mounted on the shaft 73 of the motor 71 is a bevel gear 75 and a bevel gear 76 is rigidly secured to the shaft 74 of the motor 72. A double arm 77 having a hub 78 is rotatably mounted on the shaft 73 between the motor 71 and bevel gear 75. A pulley 79 having a hub 80 is rotatably mounted on shaft 74 between the motor 72 and its bevel gear 76. Cross pieces 81 and 82 having bosses 83 and 84, respectively, have one end bolted to the double arm 77 and the other end bolted to the pulley 79, as shown. A shaft 85 is journaled in the bosses 83 and 84. Two bevel gears 86 and 87 are rotatably mounted on the shaft 85, their hubs preferably being backed against the respective bosses of the cross pieces and separated, one from the other, by a spacer 88. These two last mentioned gears 86 and 87 are so arranged that they are meshing with bevel gears 75 and 76. The driving gears 75 and 76 and the driven gears 86 and 87 form a differential gear system, and the double arm 77, pulley 79 and cross pieces 81 and 82 form a gear cage for that system. It is obvious that if the two driving gears rotate at the same speed (and in opposite directions) then the gear cage will remain stationary, but if one of the driving gears is rotated while the other is either stopped or rotated at a lesser speed then the cage will rotate in one direction or the other.

A second pulley 89 of suitable diameter is rigidly secured to the pulley 79, as shown in Figure 3. A chain 90 is secured at its upper end to the second pulley 89 and at its lower end, as shown in Figure 1, engages a hook carried by the rod insulator 20. A second chain 91 is fixed at its lower end to the pulley 79 (shown in Figure 3) in such a manner that the second chain is unwound as the first chain is wound up. The second chain 91 passes over pulleys 92 and 93 and has a counterweight 94 attached to its free end. This second chain 91 is used to position the transmitting device.

The output circuits of the "Flashtron" are connected to the two motors so that one motor is operated when the actuator circuit is closed and the other is operated when the actuator circuit is open. As best shown in Figure 7, the conductor 101 leads from the binding post 52 to both motors 71 and 72. A second conductor 100 leads from binding post 51 to the motor 71 and a third conductor 102 leads from the binding post 53 to motor 72.

A telemetric transmitter is operated by movement of the second chain 91. This sender may comprise a Wheatstone bridge arrangement, shown in Figures 1 and 7, or a sensitive Selsyn motor as shown in Figures 5 and 6. Both types operate satisfactorily and other means may be suggested by those skilled in the art. In the embodiment shown in Figure 1 a carriage 110 is attached to the chain 91, as by hooks 111 and 112. The carriage 110 rides on a rail 113. Fixed to the carriage is a bridge contact 114, which bridge is spaced between a uniformly and finely wound resistance coil 115 and a return rod 116. The resistor 115 is one arm of a Wheatstone bridge circuit hereinafter described in connection with Figures 4 and 7. The resistance of this arm of the Wheatstone bridge will depend upon the position of the carriage 110, the resistance increasing as the carriage moves toward the right. As best shown in Figure 7, the binding posts 117, 118 and 119 are connected to the resistance coil in the usual manner and also to binding posts 123, 124 and 125 by means of conductors 120, 121 and 122, respectively. The binding posts 123, 124 and 125 are adapted to receive the wires (shown as dotted lines in Figure 4) for connection to the receiving instrument.

The telemetering arrangement is shown in Figures 4 and 7 in which the receiver is indicated generally at 130. Such a receiver is adapted to indicate or record, or both, a magnitude which is proportional to the value of a remotely located resistance, such as 115 in Figure 1. There are several well known commercial devices on the market so that the receiver need not be described in detail. Briefly, such a receiver usually includes a Wheatstone bridge circuit including the equal resistance arms R and R and a third arm including the group of resistance $R_1$ and $R_2$ and 115a of which the latter only is variable. At the transmitting station is located the fourth arm of the Wheatstone bridge which is a combination of the resistance $R_1$, $R_2$ and 115 which are equal to $R_1$, $R_2$ and 115a, respectively, of the receiver 130 (the resistance 115 being variable as is the resistance 115a). The transmitter and the receiver are connected by conductors 131, 132 and 133 as shown. Thus any change in the value of the resistance 115 at the transmitter caused by a change of the liquid level in the float chamber 18 is therefore automatically indicated or recorded at the receiver 130.

When contact 33 and plate 36 are in contact one of the motors, as for example, motor 71, will rotate in a direction which will lower rod 16 and open the actuator circuit. When contact point 33 and contact plate 36 are separated the other motor, for example, motor 72, will rotate in a direction which will raise the rod 16 to again make contact with the plate 36. If we assume the level of the liquid in the stream is stationary then the level of liquid in the float chamber 18, as well as the float 34, will also be stationary. Assuming further that at a certain instant, contact 33 engages plate 36, then the actuator circuit will be closed and immediate operation of motor 71 at a higher speed than the motor 72 (the circuit to which is broken but which will, through inertia, rotate at a decreasing velocity), will cause the gear cage to rotate in a direction to lower the rod 16 and thus break the actuator circuit. Instantly, the circuit is broken, motor 72 will operate at a greater speed than motor 71, and rotate the gear cage to raise the contact 33 to again make contact with plate 36 and close the circuit, whereupon the cycle will again be repeated. It is evident that if the motors 71 and 72 were rotating at the same time the gear cage or frame would remain stationary and pulleys 79 and 89 would not move. On the other hand, if motor 72 rotates and at the same time motor 71 does not rotate, then the gear frame will move in a clockwise direction (when viewed as shown in Figure 3) and chains 90 and 91 will move in an upward direction. Conversely, if motor 71 rotates and at the same time motor 72 does not rotate the gear cage will move in a reverse direction and chains 90 and 91 will move in a downward direction. The downward movement of chains 90 and 91 will result in movement of the carriage 110 to the left, and thus to a decrease in the value of the resistance of the arm 115 of the value of the resistance of the arm 115 of the Wheatstone bridge circuit, while the upward movement of chains 90 and 91 will result in an increase in such resistance.

At equilibrium, that is, when the level of the liquid in the float chamber 18 is stationary, power will be applied alternately to motor 71 and 72 at extremely short intervals. However, because of the inertia of their respective rotors, they will slow down slightly when power is removed, but will not stop. For example, when, because of the rapidly alternately opening and closing of the actuator circuit between contact 33 and plate 36, these contacts separate momentarily power will be removed from motor 71. Because of the inertia of its rotor the motor 71 will continue to rotate at a decelerated velocity as power is applied to motor 72. At the instant power is removed from motor 71 it is applied to motor 72 and that motor will be accelerated, and the gear cage will be moved slightly to again secure contact between the contact point 33 and plate 36. Also, during the momentary contacting of contact 33 and contact plate 36, power will be removed from motor 72, but, because of the inertia of its rotor, it will continue to rotate, thereby tending to maintain the gear cage stationary. This tendency is immediately neutralized by the acceleration of motor 71 to which power is applied the instant power is removed from the motor 72. The use of two simple motors and the differential system, together with the other elements associated therewith, results in no perceptible movement of the cage 110 and therefore no change in the resistance of Wheatstone bridge arm 115 when there is no change in the level of the liquid in the float chamber 18.

Thus oscillation of contact 33 over a very small amplitude (which may be about $1/1000$ of an inch or slightly more) will continue so long as the level of liquid does not change. Correspondingly, the relative velocities of the motors will oscillate at the same rate, so that their associated differential gearing and gear cage, including pulleys 79 and 89 will oscillate at relatively high frequency. However, such oscillation is over such small amplitude and at such frequent intervals that in effect the pulleys 78 and 79 do not move, the carriage 110 does not move and the resistance of arm 51 does not change.

Should the level of liquid rise, then the float will rise and contact plate 36 will be raised away from contact point 33 to open the actuator circuit. This causes motor 72 to raise the rod 16 and contact 33 toward the new position of plate 36 and when contact is secured oscillation proceeds as previously described. Until a position corresponding to the new level has been reached, the motor 71 will have been inoperative and motor 72 will, therefore, rotate the gear cage to the new position and will also have caused carriage 110 to travel towards the right to a position corresponding to the new float level and the resistance 115 of the Wheatstone bridge circuit will assume a higher value corresponding to the higher level of the liquid.

On the other hand, should the level of liquid fall the float 34 will remain suspended upon contact point 33. So long as contact 33 is in contact which plate 36 the motor 72 will be inoperative while the motor 71 will rotate the gear cage to both lower the rod and contact 33 and also to move the carriage 110 to the left to lower the resistance of resistance coil 115. When the float 34 again freely boats upon the surface of the liquid oscillation will again proceed as previously described.

The embodiment shown in Figures 5 and 6 is essentially the same as that shown in the preceding figures differing therefrom only in slight particulars. One of the principal differences is that the contact point is a whisker which directly contacts the water, or other liquid, the level of which is being measured. Another difference is that the contact is raised and lowered by gearing instead of a chain. A third difference lies in the fact that the differential gear frame drives a Selsyn motor instead of positioning a contact on a resistance. In such a system the receiving instrument is another Selsyn motor which, if it is desired to perform work, may be connected to an amplifier.

In this embodiment the base plate 10a is supported by a standard 11. Mounted on the base plate 10a is a pair of opposed unidirectional motors 71 and 72, associated with which is a gear system and a gear frame, or cage, such as described in connection with previous figures. The entire assembly of motors, gears and gear frame is identical with that described in connection with Figure 2 except that a gear 150 is substituted for pulleys 79 and 89. Meshing with the gear 150 is an intermediate gear 151 which is keyed to a shaft 152 which in turn is journaled in bearing 153. A Selsyn motor 154 is also mounted on the base 10a and is driven by a gear 155 which meshes with the intermediate gear 151. Thus, rotation of the gear cage positions the Selsyn motor 154. The use of a Selsyn motor as a telemetering instrument is well known in the art and need not be described. Suffice to say that it is connected in the usual manner, with wiring, not shown, to a similar Selsyn motor in the receiving instrument, and, due to the characteristics of such motors, the receiving motor will assume the same position as that of the motor in the transmitter. Modern Selsyn motors of high efficiency give a highly delicate measurement over an infinite range of magnitude without lagging between the two motors. Thus the motor of the receiving instrument gives a reading corresponding to that of the transmitting motor with an accuracy corresponding to about $1/1000$ of an inch in the liquid level being measured.

Extending horizontally from a bracket 160, on the base plate 10a, is a tubular arm 161. The outer end of the arm 161 provides a bearing 162 in which is journaled a shaft 163 that extends along the center axis of the arm 161. The transmission shaft 163 is coupled to the shaft 152 by any suitable coupling means, such as the bellows 164. A gear 165 is keyed to the transmission shaft 163 as shown.

The guide tube 15a is mounted on the arm 161 by any suitable means such as by welding. The contact rod 16a provides a rack 166 which meshes with the gear 165, so that rotation of the shaft 163 will raise or lower the contact rod 16a.

For purposes of illustration I show a contact whisker 170 fixed to the lower end of the contact rod 16a, the whisker directly engaging the liquid in the pot 18a. As indicated above, the float contact described above in connection with Figure 1 is far more accurate than direct contact of the whisker with the liquid. However, for many purposes an accuracy of approximately .015 of an inch is entirely satisfactory and in such cases direct contact may be used.

The Flashtron is not shown in either Figure 5 or 6 but it will be understood that it is an integral part of the control system and that it works in this embodiment exactly the same way as in connection with the form shown in Figure 1. It is therefore believed that it is unnecessary to complicate the drawing or the specification by including it. It should suffice to say that the actuator circuit is connected through the basin 18a and the whisker 170 to supply power to one motor and to cut off power to the other motor.

While in this description the application of this invention was described with particular reference to indicating or recording the surface level and changes, minute or great, in the surface level of a liquid, it will be evident to those skilled in the art that the invention may be applied to indicate, or record, positions and changes in position of any movable member. Further, it will be evident to those skilled in the art that the same mechanism which automatically positions the mechanism at the receiver may also be used to perform work as well as to position a pointer. Thus, the receiving mechanism may not only indicate or record the changes in the magnitude, but may also do some work in connection therewith, such as controlling the feeding of a dosing chemical to a water supply or the like. It will also be obvious to those skilled in the art that it will be desirable to provide limit switches to prevent appreciable overtravel of the motors beyond their operating limits, but as such things are well known they have been omitted from the drawings and description in order to simplify understanding of my invention.

I claim:

1. Apparatus for measuring the motion of an element comprising an element the motion of which is to be measured, a contact member adapted to engage said element, a double immediately responsive inertialess relay, an actuating circuit for said relay including said element and said member, a pair of unidirectional motors in opposed spaced relationship, said motors being so connected to said relay that either one or the other receives power through the relay, a differential system connected to said motors and so constructed and arranged that it is motionless when both motors operate at the same speed but rotates if either motor operates at a higher velocity than the other, and means operatively connecting said contact member to said differential system, whereby the contact member is positioned by movement of the system.

2. In a system for telemetering variations in the position of an element, a position gauge comprising a contact member adapted to contact the element the position of which is to be measured, a relay means, an actuating circuit for said relay means including said member and so constructed and arranged as to be closed only when the contact member is in contact with said element, a pair of unidirectional motors in opposed spaced relationship, said motors being so connected to said relay means that one of said motors receives power through the relay means when the actuating circuit is closed and the other motor receives power when the actuating circuit is open, a reversible element, differential gearing connecting said reversible element to said motors and so constructed and arranged that the said element is motionless when both motors are operated at the same speed but moves if either motor operates at a higher velocity than the other, means operatively connecting said contact member to said reversible element, whereby the contact member is positioned by movement of the reversible element, and means adapted to connect said gearing to an electric transmitter.

3. A liquid level gauge comprising a float adapted to float on the liquid the level of which is to be measured, a contact member adapted to engage said float, a double immediately responsive inertialess relay, an actuating circuit for said relay including said float and said contact member, a pair of unidirectional motors in opposed spaced relationship, said motors being so connected to said relay that one of said motors receives power when the actuator circuit is closed and the other receives power when the actuator circuit is open, a differential gear frame mounted for rotation about the shafts of said motors, a driving gear on the rotor of each of said motors, a driven gear journaled in said frame and meshing with both of said driving gears, means operatively connecting said contact member to said frame, whereby the contact member is positioned by movement of the frame, said frame being adapted to be connected to, and to position by its movement, an electric transmitting member.

4. In a device for telemetering variations in a liquid level a liquid level gauge comprising a contact member adapted to engage the liquid whose surface is to be measured, a double immediately responsive inertialess relay, an actuating circuit for said relay including the liquid whose surface is to be measured and said member, a pair of unidirectional motors in opposed spaced relationship, said motors being so connected to said relay that one of said motors receives power when said actuator circuit is closed and the other of said motors receives power when the actuator circuit is open, a differential gear frame mounted for rotation about the shafts of said motors, a driving gear on the rotor of each of said motors, a driven gear journaled in said frame and meshing with both of said driving gears, and means operatively connecting said contact member to said frame, whereby the contact member is positioned by movement of the frame.

5. A liquid level measuring device comprising a contact member, an actuating circuit including said contact member and the liquid the level of which is to be measured, two immediately responsive inertialess relays, one of which closes one power circuit when the actuating circuit is closed and the other of which closes another power circuit when the actuating circuit is open, a pair of unidirectional motors in opposed spaced relationship, one of said motors being in one of said power circuits and the other motor in the other power circuit, a differential gear frame rotatably mounted with respect to said motors, driving gears journaled in said frame and connected to each of said motors, a driven gear journaled in said frame and meshing with each of said driving gears, means operatively connecting said contact member to said frame whereby the contact member is positioned by movement of the frame, said frame being adapted to be connected to a metering member in manner to position such member by its movement.

SAMUEL L. ADELSON.

REFERENCES CITED

The following references are of record in the file of this patent:

UNITED STATES PATENTS

| Number | Name | Date |
|---|---|---|
| 1,350,705 | Clarke | Aug. 24, 1920 |
| 1,664,265 | Rieber | Mar. 27, 1928 |
| 1,916,737 | Midworth | July 4, 1933 |
| 2,116,593 | Bouvier | May 10, 1938 |
| 2,422,313 | Razek | June 17, 1947 |
| 2,445,200 | Wolfe | July 13, 1948 |

Certificate of Correction

Patent No. 2,496,366                                            February 7, 1950

SAMUEL L. ADELSON

It is hereby certified that errors appear in the printed specification of the above numbered patent requiring correction as follows:

Column 1, line 40, for the word "detail" read *detailed*; column 7, line 62, for "which" read *with*; line 67, for "boats" read *floats*;

and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*